April 20, 1937. H. RIEPERT 2,077,809
MICROPHOTOGRAPHIC APPARATUS WITH MIRRORSCOPE CAMERA
Filed Nov. 16, 1934
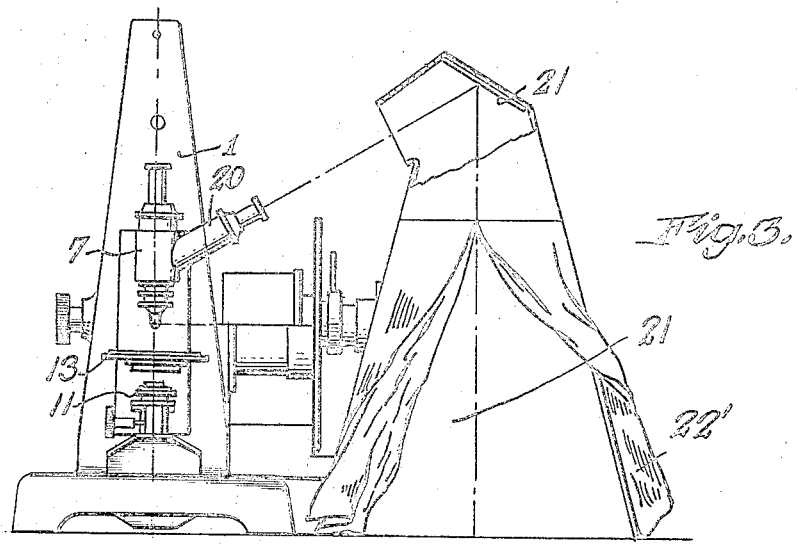
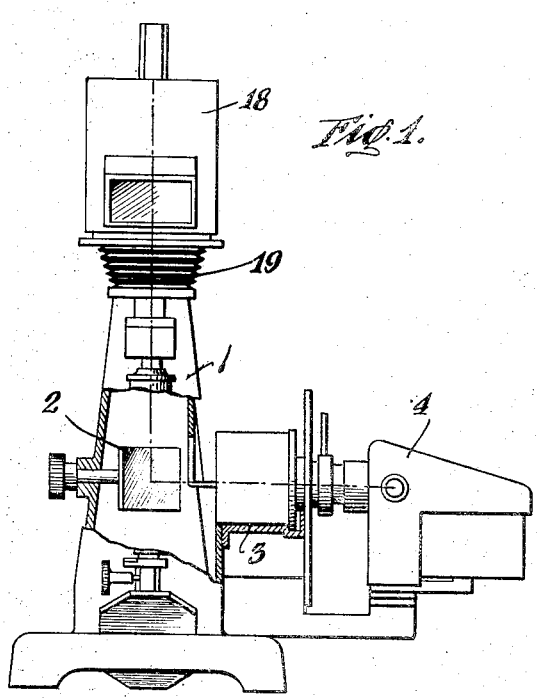
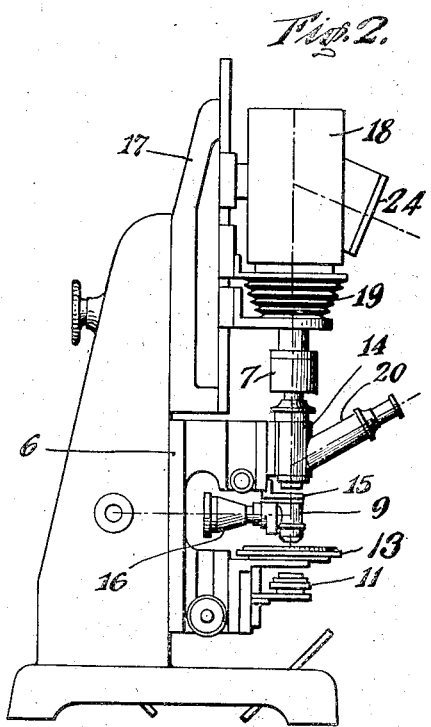
INVENTOR
Hermann Riepert
BY
ATTORNEY Patented Apr. 20, 1937

2,077,809

UNITED STATES PATENT OFFICE 2,077,809

MICROPHOTOGRAPHIC APPARATUS WITH MIRRORSCOPE CAMERA

Hermann Riepert, Wetzlar, Germany, assignor to Ernst Leitz, Optische Werke, G. m. b. H., Wetzlar, Province of Hesse-Nassau, Germany Application November 16, 1934, Serial No. 753,251
In Germany November 18, 1933

1 Claim. (Cl. 88—24)

The present invention has for its object a microphotographic device equipped or combined with a mirrorscope camera, and it is the principal object of my invention to provide this device with a means to change the illumination by the intermediary of swinging or turning mirrors.

With this end in view a closed and compact optical bench is provided at the shaft equipped with the holders for the exchangeable bodies of illumination, said bench for the reception of the various exchangeable parts of the microscope, of the camera and all minor accessories.

Another object of my invention is the provision of a device of this character equipped with a focusing screen or opaque plate arranged diagonally to the camera's negative holder to display to an observer in front of the microscope simultaneously the picture developing in the camera.

These and other objects and advantages of my invention will become more fully known as the description thereof proceeds, and will then be specifically defined in the appended claims.

In the accompanying drawing forming a material part of this disclosure:

Fig. 1 is the front elevation, partly in section, of a microphotographic device equipped with a mirrorscope camera.

Fig. 2 is a side view of the device, Figure 1.

Fig. 3 illustrates, in front elevation, a drawing instrument combined with the apparatus, Figure 1.

As illustrated, the shaft or post 1 serves as support for a photographic camera and contains a turning or swinging mirror 2 by means of which the illumination for the object may be regulated or changed.

A holder or support 3 contains an arc light as for instance indicated at 4. A closed optical bench 6 is combined with the post 1 which constitutes the housing for a microscope 7 including its exchangeable object supporting table 13 and tubus 14 and objective holder 15, which both are also exchangeable.

The illumination is provided by the arc light 4 and the objective holder 15 is provided with a device for circular illumination, so that the light tunnel 16 is directed towards the swinging mirror 2.

The post or standard 1 carries an optical bench 17 to which is attached a camera 18 which may for instance have a bellows 19 and is a mirrorscope camera, but may be exchanged for any other camera of suitable construction if so desired.

The vertically arranged microscope may be used for subjective observation as well as for observations with diffusing or direct light 11 and the tubus 20 is adjustable for projection or may be laterally swung for the purpose of making drawings of the object.

The opaque plate is designated 24 and the optical axis of the source of light is designated 26 and is nearly or approximately parallel to the plane of the opaque plate or focusing disk 24.

In Figure 3, I have illustrated a device substantially constructed as the device illustrated in Figure 2 in combination with a drawing device 21 in its top including a mirror 21 for the reception of the picture rays emanating from tubus 20 and reflecting the same upon the drawing surface forming the bottom of a chamber darkened in front by means of a movable curtain 22'.

It will be understood that I have described and shown the preferred forms of my invention as some examples of the many possible ways to practically construct the same, and that I may make such changes in the general arrangement thereof and in the construction of its minor details as come within the scope of the appended claim without departure from the spirit of my invention and the principles involved.

Having thus described my invention, what I claim as new and desire to secure by Letters Patent is:

In a microphotographic apparatus including a microscope, a mirrorscope camera, a hollow column supporting said camera, a source of light exchangeably secured to said support, a swinging mirror in said column in alignment with said source of light, a closed optical bench combined with said column, and constituting the housing for said vertically arranged microscope, an object supporting table for said microscope below the objective of said camera on which the light from said source of light is reflected by said swinging mirror, and a drawing apparatus connected with said microphotographic apparatus and including a mirror, an exchangeable and turnable tubus associated with the microscope and camera for projecting a picture of the object under observation by the microscope to the mirror of the drawing apparatus for projection upon the drawing plane of said apparatus, a curtain for said drawing apparatus, and a horizontal negative holder for said camera, an opaque plate angularly disposed to said negative holder on said camera upon which the picture taken by the camera of the object under observation by the microscope is directly reflected to display the same to an observer simultaneously with the developing of the picture in the camera.

HERMANN RIEPERT.